(12) United States Patent
Tang

(10) Patent No.: US 12,079,201 B2
(45) Date of Patent: Sep. 3, 2024

(54) BLOCKCHAIN-BASED DATA STORAGE METHOD, RELATED DEVICE AND STORAGE MEDIUM

(71) Applicant: SIMPLECREDIT MICRO-LENDING CO., LTD., Chongqing (CN)

(72) Inventor: Yinhui Tang, Chongqing (CN)

(73) Assignee: SIMPLECREDIT MICRO-LENDING CO., LTD., Chongqing (CN)

( * ) Notice: Subject to any disclaimer, the term of this patent is extended or adjusted under 35 U.S.C. 154(b) by 624 days.

(21) Appl. No.: 17/282,312

(22) PCT Filed: Jun. 20, 2019

(86) PCT No.: PCT/CN2019/092086
§ 371 (c)(1),
(2) Date: Apr. 1, 2021

(87) PCT Pub. No.: WO2020/133962
PCT Pub. Date: Jul. 2, 2020

(65) Prior Publication Data
US 2021/0382872 A1 Dec. 9, 2021

(30) Foreign Application Priority Data
Dec. 27, 2018 (CN) .......................... 201811616630.6

(51) Int. Cl.
*G06F 16/23* (2019.01)
*G06F 16/27* (2019.01)
*H04L 65/40* (2022.01)

(52) U.S. Cl.
CPC ................ *G06F 16/2379* (2019.01)

(58) Field of Classification Search
CPC ....... G06F 16/2379; G06F 16/27; H04L 65/40
See application file for complete search history.

(56) References Cited

U.S. PATENT DOCUMENTS

| 11,423,398 B1 * | 8/2022 | Mullins .................. G06Q 20/36 |
| 2018/0139042 A1 * | 5/2018 | Binning ............. G06Q 20/1235 |

(Continued)

FOREIGN PATENT DOCUMENTS

| CN | 107079059 A | 8/2017 | |
| CN | 109756566 A | 5/2019 | |
| CN | 108900364 B * | 11/2021 | ........... H04L 41/042 |

OTHER PUBLICATIONS

International search report of PCT Patent Application No. PCT/CN2019/092086 issued on Sep. 26, 2019.

*Primary Examiner* — Robert W Beausoliel, Jr.
*Assistant Examiner* — Mohammad S Bhuyan (57) ABSTRACT

A blockchain-based data storage method, comprising: a target node acquires the serial number of a newly generated first block broadcasted in a blockchain system, the target node is any one of a plurality of nodes, the first block comprises block data and a block head, and the block head comprises the serial number of the first block; the target node obtains a first token seed, the first token seed is generated according to the number of nodes of the blockchain system; the target node determines a first serial number range where the first block is located on the basis of the first token seed and the serial number of the first block; and the target node determines to store the first block or store the block head of the first block on the basis of the first serial number range and a first token value of the target node.

24 Claims, 3 Drawing Sheets

(56) References Cited

U.S. PATENT DOCUMENTS

2019/0116034 A1\* 4/2019 Sengupta ............. G06Q 20/065
2019/0182029 A1\* 6/2019 Yim ...................... H04L 9/0637
2019/0208414 A1\* 7/2019 Roennow ............ G06F 16/1824

\* cited by examiner

BLOCKCHAIN-BASED DATA STORAGE METHOD, RELATED DEVICE AND STORAGE MEDIUM

FIELD OF THE INVENTION

The present invention relates to the technical field of computers, and in particular, to a blockchain-based data storage method, a related device and a storage medium.

BACKGROUND OF THE INVENTION

According to most of the current blockchain storage technologies, all block data are directly stored on the blockchain, that is, all the nodes of the blockchain store the same block data. This method is generally applied to public chain storage. However, as the operation time of the blockchain increases, the amount of data in the blockchain will become larger and larger, especially in the big data environment, the amount of data required to be stored on each node will become larger and larger. It can be seen that the above commonly used block storage technology will bring greater data storage pressure to each node in the blockchain.

SUMMARY OF INVENTION

An embodiment of the present invention provides a blockchain-based data storage method, a related device and a storage medium, such that the data storage pressure of nodes can be effectively relieved.

In a first aspect, an embodiment of the present invention provides a data storage method, applied to a blockchain system. The blockchain system comprises a plurality of nodes. The method comprises:
  acquiring, by a target node, the serial number of a newly generated first block broadcasted in the blockchain system, wherein the target node is any one of the plurality of nodes, the first block comprises block data and a block head, and the block head comprises the serial number of the first block;
  acquiring, by the target node, a first token seed, wherein the first token seed is generated according to the number of nodes of the blockchain system;
  determining, by the target node, a first serial number range where the first block is located on the basis of the first token seed and the serial number of the first block; and
  determining, by the target node, to store the first block or store the block head of the first block on the basis of the first serial number range and a first token value of the target node.

In one embodiment, the determining, by the target node, a first serial number range where the first block is located on the basis of the first token seed and the serial number of the first block comprises:
  determining, by the target node, a target block unit where the first block is located on the basis of the serial number of the first block, wherein each block unit includes the same number of blocks;
  dividing, by the target node, the target block unit on the basis of the first token seed to obtain a plurality of serial number ranges, wherein different serial number ranges correspond to different token values; and
  determining, by the target node, the first serial number range where the first block is located from the plurality of serial number ranges on the basis of the serial number of the first block.

In one embodiment, the determining, by the target node, to store the first block or store the block head of the first block on the basis of the first serial number range and a first token value of the target node comprises:
  determining, by the target node, a target serial number range corresponding to the first token value from the plurality of serial number ranges;
  judging, by the target node, whether the first serial number range is consistent with the target serial number range;
  if yes, storing, by the target node, the first block; and
  if no, storing, by the target node, the block head of the first block.

In one embodiment, the method further comprises:
  acquiring, by the target node, a second token seed when the token seed update time is reached, wherein the second token seed is generated on the basis of the number of the current nodes of the blockchain system when the token seed update time is reached;
  updating, by the target node, the first token value on the basis of the second token seed to obtain a second token value of the target node; and
  determining, by the target node, a second serial number range where the first block is located on the basis of the second token seed and the serial number of the first block, and updating the blocks stored in the target node on the basis of the second serial number range and the second token value.

In one embodiment, the updating the blocks stored in the target node on the basis of the second serial number range and the second token value comprises:
  determining, by the target node, a block needing to be stored and a block needing to be deleted according to the second serial number range and the second token value; and
  storing, by the target node, the block needing to be stored and recording the block needing to be deleted.

In one embodiment, the storing, by the target node, the block needing to be stored comprises:
  transmitting, by the target node, a block acquisition request to a first node, wherein the block acquisition request comprises the serial number of the block that the target node needs to store but does not store, and the first node is any one of a node set with token values different from the second token value in the blockchain system;
  receiving, by the target node, the block that the target node needs to store but does not store, which is transmitted by the first node on the basis of the block acquisition request; and
  storing, by the target node, the block that the target node needs to store but does not store.

In one embodiment, the method further comprises:
  deleting, by the target node, block data of the block needing to be deleted recorded in the last token cycle, wherein the token cycle is a time period when two adjacent token seeds are generated.

In one embodiment, the updating, by the target node, the first token value on the basis of the second token seed to obtain a second token value of the target node comprises:
  performing, by the target node, calculation according to the first token seed, the second token seed and the first token value of the target node when the first token seed is greater than the second token seed, and determining the calculation result as the second token value of the target node; and
  determining, by the target node, the value range of the second token value of the target node according to the first token seed, the second token seed and the first token value of the target node when the first token seed is less than the second token seed, and determining the second token value from the value range.

In one embodiment, the serial number of a genesis block included in the blockchain system is 0, and any node in the blockchain system stores the genesis block.

In one embodiment, a value of the token seed meets $2^n$, wherein n is a positive integer. The token seed comprises the first token seed and the second token seed.

In a second aspect, an embodiment of the present invention provides a data storage device, applied to a blockchain system. The blockchain system comprises a plurality of nodes. The device comprises:
an acquisition unit, used for acquiring the serial number of a newly generated first block broadcasted in the blockchain system, wherein the target node is any one of the plurality of nodes, the first block comprises block data and a block head, and the block head comprises the serial number of the first block;
the acquisition unit being further used for acquiring a first token seed, wherein the first token seed is generated according to the number of nodes of the blockchain system; and
a determination unit, used for determining a first serial number range where the first block is located on the basis of the first token seed and the serial number of the first block;
the determination unit being further used for determining to store the first block or store the block head of the first block on the basis of the first serial number range and a first token value of the target node.

In one embodiment, the determination unit is specifically used for:
determining a target block unit where the first block is located on the basis of the serial number of the first block, wherein each block unit includes the same number of blocks,
dividing the target block unit on the basis of the first token seed to obtain a plurality of serial number ranges, wherein different serial number ranges correspond to different token values; and
determining the first serial number range where the first block is located from the plurality of serial number ranges on the basis of the serial number of the first block.

In one embodiment, the determination unit is specifically used for:
determining a target serial number range corresponding to the first token value from the plurality of serial number ranges;
judging whether the first serial number range is consistent with the target serial number range;
if yes, storing the first block; and
if no, storing the block head of the first block.

In one embodiment, the device further comprises an update unit.

The acquisition unit is further used for acquiring a second token seed when the token seed update time is reached, wherein the second token seed is generated on the basis of the number of the current nodes of the blockchain system when the token seed update time is reached;
the update unit is used for updating the first token value on the basis of the second token seed to obtain a second token value of the target node;
the update unit is further used for determining a second serial number range where the first block is located on the basis of the second token seed and the serial number of the first block, and updating the blocks stored in the target node on the basis of the second serial number range and the second token value.

In one embodiment, the determination unit is specifically used for:
determining a block needing to be stored and a block needing to be deleted according to the second serial number range and the second token value; and
storing the block needing to be stored and recording the block needing to be deleted.

In one embodiment, the determination unit is specifically used for:
transmitting a block acquisition request to a first node, wherein the block acquisition request comprises the serial number of the block that the target node needs to store but does not store, and the first node is any one of a node set with token values different from the second token value in the blockchain system;
receiving the block that the target node needs to store but does not store, which is transmitted by the first node on the basis of the block acquisition request; and
storing the block that needs to be stored but is not stored.

In one embodiment, the device further comprises a deletion unit.

The deletion unit is used for deleting block data of the block needing to be deleted recorded in the last token cycle, wherein the token cycle is a time period when two adjacent token seeds are generated.

In one embodiment, the update unit is specifically used for:
performing calculation according to the first token seed, the second token seed and the first token value of the target node when the first token seed is greater than the second token seed, and determining the calculation result as the second token value of the target node; and
determining the value range of the second token value of the target node according to the first token seed, the second token seed and the first token value of the target node when the first token seed is less than the second token seed, and determining the second token value from the value range.

In a third aspect, an embodiment of the present invention provides a server. The server comprises: a memory, a processor and a network interface, wherein the memory stores a computer program, the network interface is used for receiving and transmitting a message under the control of the processor, and the processor implements the method as defined in any one of the first aspect when executing the computer program.

In a fourth aspect, an embodiment of the present invention provides a computer-readable storage medium. The computer-readable storage medium stores a computer program. The computer program, when being executed by the processor, implements the method as defined in any one of the first aspect.

In the embodiment of the present invention, the target node first acquires the serial number of the newly generated first block broadcasted in the blockchain system and acquires the first token seed generated on the basis of the number of the nodes of the blockchain system so as to determine the first serial number range where the first block is located on the basis of the first token seed and the serial number of the first block and further determine to store the first block or store the block head of the first block on the basis of the first serial number range and the first token value of the target node, thereby effectively relieving the data storage pressure of the target node, improving the problem of too large network flow in the blockchain system and preventing the data in the blockchain system from being tampered maliciously.

BRIEF DESCRIPTION OF THE DRAWINGS

To describe the technical solutions in the embodiments of the present invention more clearly, the accompanying drawings required for describing the embodiments will be briefly introduced below. Apparently, the accompanying drawings in the following description show merely some embodiments of the present invention, those of ordinary skill in the art may still derive other drawings from these accompanying drawings without creative efforts.

DETAILED DESCRIPTION OF ILLUSTRATED EMBODIMENTS

The technical solutions in the embodiments of the present invention will be clearly and completely described with reference to accompanying drawings in the embodiments of the present invention. Apparently, the described embodiments are merely a part rather than all of the embodiments of the present invention. All other embodiments obtained by a person of ordinary skill in the art based on the embodiments of the present invention without creative efforts shall fall within the protection scope of the present invention.

In the current blockchain-based data storage method, a set of another storage system can be deployed on the basis of a public chain, such that the data storage pressure of various nodes can be relieved by storing summary data of the block, for example, storing block head data of the block. However, since the method needs to deploy a new storage system for data storage, the cost input is increased; and this storage method is not suitable for public chain storage, so the method is not suitable for all the blockchain storage systems. Based on this, the present application provides a novel blockchain data storage method. By the method, each node in the blockchain system only stores part of block data, instead of storing all the block data in the blockchain system, such that the data storage pressure of various nodes can be effectively reduced. Secondly, to prevent the block data from being maliciously tampered, each node can further store the block head of the block data which are not stored by the node.

By the above blockchain-based data storage method, the simple deployment scheme stored on the public chain is maintained, the tamper-proof traceability of the blockchain is also maintained, the storage bottleneck of the blockchain nodes can also be solved, and the network flow among the nodes can be reduced.

Figure 1:
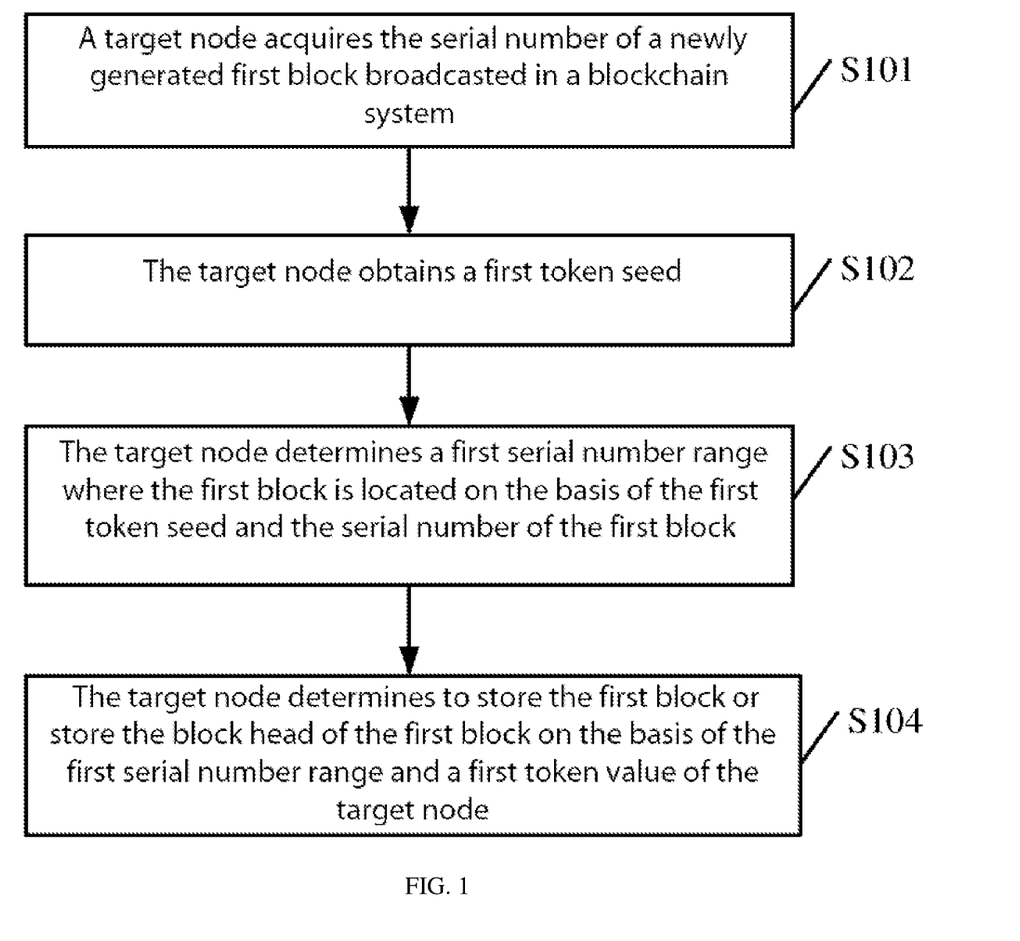
FIG. 1 is a schematic flowchart of a data storage method provided by an embodiment of the present invention.

S101: a target node acquires the serial number of a newly generated first block broadcasted in the blockchain system.

In one embodiment, the target node is any one of a plurality of nodes in the blockchain system. The first block comprises block data and a block head. The block head comprises the serial number of the first block. In the specific implementation, the blockchain will generate a serial number corresponding to the block when generating each block, and correspondingly stores the generated serial number into the block head of the block. The serial number of the block in the blockchain begins to progressively increase from a genesis block, wherein the serial number of the genesis block is 0, and each block in the blockchain has a different serial number; therefore, after any node stores the serial number of a certain block, the block head corresponding to the serial number of the block can be determined on the basis of the serial number of the block, such that the corresponding block can be determined according to the block head, and whether the block data of the block change can be determined by comparing the block head. The block head further comprises summary data of the block (such as the first block), such that even if the node (such as the above target node) only stores the block head of the block, the block data corresponding to the serial number can be prevented from being tampered.

When any node in the blockchain system newly generates a first block, the node which generates the first block can broadcast to the blockchain system to inform other nodes in the blockchain system. After the blockchain system newly generates the first block and the target node receives the broadcast, the serial number of the newly generated first block broadcasted in the blockchain system is acquired, such that whether the first block is stored in the target node is determined on the basis of the serial number of the first block acquired by the target node, the first token seed determined in the step S102 and a first token value of the target node.

S102: the target node obtains a first token seed.

In one embodiment, the first token seed is generated according to the number of nodes included in the blockchain system. The first token seed is also the maximum value of the token values of nodes in the blockchain system. After the first token seed is generated according to the total number of the nodes included in the blockchain, each node can generate a token value corresponding to the node on the basis of the first token seed, for example, the target node in the blockchain system can generate a first token value of the target node according to the first token seed, that is, the first token value of the target node.

It should be noted that the token seed is generated by the blockchain system, specifically by a certain node in the blockchain system, for example, the token seed can be generated by a node which generates a new block (such as the newly generated first block mentioned above). When the token seed update time is reached, the node generating the new block generates a new token seed after generating the new block, and broadcasts the new block and the new token seed in the blockchain system.

Each node in the blockchain system can generate a corresponding token value according to the first token seed. The token value is a value for marking the node in the blockchain, for example, the first token value is used for marking the target node. When each node in the blockchain system generates the corresponding token value according to the first token seed, the token value generated by each node is less than or equal to the first token seed.

Specifically, the value of the token seed in the blockchain system meets $2^n$, wherein n is a positive integer. In general, n is an integer greater than or equal to 2, and the value of the token seed is far less than the number of the nodes included in the blockchain system, so in the blockchain system, there are a plurality of nodes corresponding to the same token seed.

In the specific implementation, the step S102 and the step S101 do not have a necessary execution sequence. It is possible that the step S101 is first performed and the step S102 is then performed, it is also possible that the step S102 is first performed and the step S101 is then performed, and it is also possible that the step S101 and the step S102 are performed at the same time, which are not limited by the embodiments of the present invention.

S103: the target node determines a first serial number range where the first block is located on the basis of the first token seed and the serial number of the first block.

In one embodiment, after the first block is newly generated, the number of the blocks included in the blockchain system changes. To determine the first serial number range where the first block is located, the serial numbers of the blocks included in the blockchain system can be divided, that is, it is necessary to divide the number of the blocks included in the blockchain system after the number of the blocks changes. The serial numbers of the blocks in the blockchain system can be divided by the blockchain system, specifically, the serial number of the blocks in the blockchain system can be divided by a certain node in the blockchain system, such as the target node.

When the serial numbers of the blocks included in the blockchain system are divided, all the blocks included in the blockchain system can be first divided into a plurality of block units. Specifically, the blocks included in the blockchain system can be sorted on the basis of the serial numbers of the blocks, and the blocks included in the blockchain system are divided according to a preset number, for example, taking $2^m$ blocks as a unit, the blocks included in the blockchain system are divided to obtain a plurality of block units, and the serial numbers of the blocks of each block unit in the obtained plurality of the block units can be sorted according to the serial number sequence of the blocks, wherein each obtained block unit includes at least one block, m is an integer greater than or equal to n, generally the value of m is 10, that is, after the blocks in the blockchain system are divided, each obtained block unit comprises $2^{10}$, 1024 blocks.

In one embodiment, after the blockchain system is divided into a plurality of block units, the target node can determine a target block unit where the first block is located, wherein each block unit includes the same number of blocks, such that the target node can divide the blocks included in the target block unit on the basis of the first token seed to obtain a plurality of serial number ranges. Any serial number range corresponds to one token value, such that the first serial number range where the first block is located can be determined from the plurality of serial number ranges on the basis of the serial number of the first block.

Specifically, assuming that the target block unit comprises $2^m$ blocks and the first token seed is $2^n$, the $2^m$ blocks are divided into $2^n$ parts to obtain a plurality of serial number ranges, wherein each serial number range corresponds to one token value, for example, the token value corresponding to the blocks within the serial number range of $0\text{-}2^{m-n}-1$ is 1, the token value corresponding to the blocks within the serial number range of $2^{m-n}\text{-}2^{m-n+1}-1$ is 2, and so on. The first serial number range where the first block is located can be determined on the basis of the first token seed and the serial number of the first block, such that the step S104 can be performed instead, and the target node can determine to store the first block or store the block head of the first block.

S104: the target node determines to store the first block or store the block head of the first block on the basis of the first serial number range and a first token value of the target node.

In one embodiment, when determining to store the block of the first block or store the block head of the first block, the target node can determine a target serial number range in which the first token value needs to be stored correspondingly on the basis of the first token value of the target node so as to determine that the target node stores the first block or stores the block head of the first block on the basis of the first serial number range and the target serial number range. The target serial number range can be compared with the first serial number range, if the target serial number range is consistent with the first serial number range, it is indicated that the serial number range in which the target node needs to store correspondingly comprises the serial number of the first block, and the target node can store the first block, if the target serial number range is not consistent with the first serial number range, it is indicated that the serial number range in which the target node needs to store correspondingly does not comprise the serial number of the first block, and the target node stores the block head of the first block.

For example, assuming that m is 10 and n is 3, there are $2^{10}=1024$ blocks in each block unit. Let the first token seed be $2^3=8$, then after the serial numbers of the blocks included in each block unit are divided on the basis of the first token seed 8, each serial number range of the obtained plurality of serial number ranges has 128 blocks. Assuming that the first token value of the target node is 1, based on the division result, it is determined that the target serial number range of the blocks needing to be stored correspondingly is 0-127 when the first token value is 1. If the serial number of the first block is 23, it is determined that the first serial number range where the first block is located is 0-127. Since the first serial number range where the first block is located is consistent with the target serial number range determined according to the first token value, the target node stores the first block. If the serial number of the first block is 200, it is determined that the first serial number range where the first block is located is 128-255. At this time, the first serial number range where the first block is located is not consistent with the target serial number range determined according to the first token value, then the target node stores the block head of the first block.

It should be noted that the genesis block will be stored in all the nodes of the blockchain system, that is, even if it is determined that the target serial number range which the target node needs to store does not comprise the serial number of the genesis block according to the division result and the first token value of the target node, the target node still stores the genesis block.

In the embodiment of the present invention, the target node first acquires the serial number of the newly generated first block broadcasted in the blockchain system and acquires the first token seed generated on the basis of the number of the nodes of the blockchain system so as to determine the first serial number range where the first block is located on the basis of the first token seed and the serial number of the first block and further determine to store the first block or store the block head of the first block on the basis of the first serial number range and the first token value of the target node, thereby effectively relieving the data storage pressure of the target node, improving the problem of too large network flow in the blockchain system and preventing the data in the blockchain system from being tampered maliciously.

Figure 2:
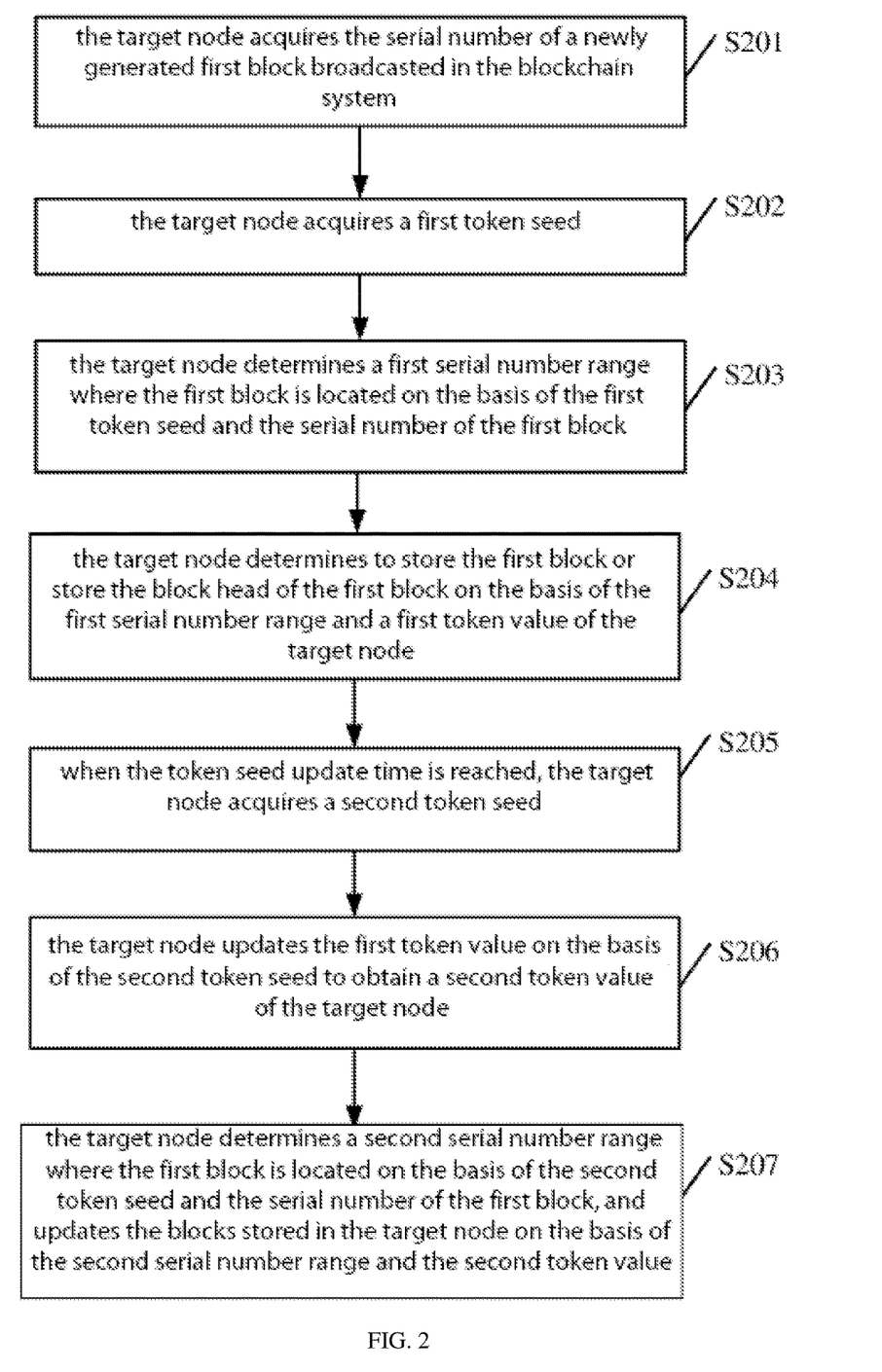
FIG. 2 is a schematic flowchart of a data storage method provided by another embodiment of the present invention.

Referring to FIG. 2 which is a schematic flowchart of a data storage method provided by another embodiment of the present invention, the method is applied to the above blockchain system. The blockchain system comprises a plurality of nodes. As shown in FIG. 2, the method can comprise:

S201: a target node acquires the serial number of a newly generated first block broadcasted in the blockchain system.

S202: the target node obtains a first token seed.

S203: the target node determines a first serial number range where the first block is located on the basis of the first token seed and the serial number of the first block.

In one embodiment, the specific implementation manner of the steps S201-S203 can refer to the implementation manner of the steps S101-S103 in the above embodiment, which will not be elaborated herein.

S204: the target node determines to store the first block or store the block head of the first block on the basis of the first serial number range and the first token value of the target node.

When the target node determines to store the first block or store the block head of the first block on the basis of the first serial number range and the first token value of the target node, the target node can first determine a target serial number range corresponding to the first token value from the plurality of serial number ranges. The blocks corresponding to the serial numbers included in the target serial number range are blocks that the target node needs to store. Further, the target node can judge whether the target serial number range is consistent with the first serial number range. When the target serial number range is consistent with the first serial number range, it is indicated that the blocks that the target node needs to store comprise the first block and the first block is stored. When the target serial number range is not consistent with the first serial number range, it is indicated that the blocks that the target node needs to store do not comprise the first block, and the block head of the first block is stored.

S205: when the token seed update time is reached, the target node obtains a second token seed.

In one embodiment, the second token seed is generated on the basis of the number of the current nodes of the blockchain system when the update time is reached. The token seed update time can be a preset time interval. Assuming that the preset time interval is 2 weeks, the target node acquires one second token seed every two weeks. Or the token seed update time is set on the basis of an update cycle. The update cycle is a time period when two adjacent token seeds are generated. When the token seed update time is set according to the update cycle, the token seed update time can be set on the basis of the last token cycle. The set token seed update time may be equal to the last token cycle or may not be equal to the last token cycle.

With the increase of the operation time of the blockchain system, the number of the nodes of the blockchain system will change. When a new node is added into the blockchain system, the number of the nodes of the blockchain system is increased. When a node exits the blockchain system, the number of the nodes of the blockchain system is reduced. When the number of the nodes of the blockchain system changes, the changed node will be broadcasted in the blockchain system, such that other nodes in the blockchain system determine the change of the number of the nodes in the blockchain system. Therefore, when the token seed update time is reached, the second token seed acquired by the target node may be as same as the first token seed or may be different from the first token seed.

In one embodiment, if the token seed update time is reached, the number of the nodes included in the blockchain system changes, the blockchain system can generate the second token seed on the basis of the changed number of the nodes, and broadcast the second token seed, such that the target node acquires the second token seed from the blockchain system. Specifically, the second token seed can also be generated by a certain node in the blockchain system, for example, a node which generates the first block.

In one embodiment, when the second token seed is determined, the second token seed can be generated randomly on the basis of the changed number of the nodes in the blockchain system, or the second token seed can be generated according to a preset generation rule and in combination with the first token seed and the number of the nodes before the number of the nodes of the blockchain system changes. Generally speaking, when the number of the nodes in the blockchain system is increased, the determined second token seed is greater than the first token seed. When the number of the nodes in the blockchain system is reduced, the determined second token seed is less than the first token seed.

After the target node acquires the second token seed, the step S206 can be performed to update the blocks stored in the target node.

S206: the target node updates the first token value on the basis of the second token seed to obtain a second token value of the target node.

After the target node acquires the second token seed, each node in the blockchain system updates the token value corresponding to the node according to the second token seed. Specifically, the target node can update the first token value of the target node based on the second token seed to obtain a second token value of the target node.

When the target node updates the first token value of the target node on the basis of the second token seed, the first token value of the target node can be randomly selected on the basis of the updated second token seed to update the first token value of the target node, and the random value result serves as the second token value of the target node.

In one embodiment, when the token value of the node is updated, to reduce the modification on the data stored in the node after each node in the blockchain system updates the token value, that is, to reduce the operation of storing the added block in the corresponding node after each node updates the token value and to reduce the operation of deleting the block data from the corresponding node, the token value of each node can be updated according to a preset token value update rule, thereby obtaining an updated token value of each node.

Taking the target node as an example, when the first token value of the target node is updated according to the preset token value update rule, the first token seed can be compared with the second token seed first, if the first token seed is greater than the second token seed, the target node can perform calculation according to the first token seed, the second token seed and the first token value corresponding to the target node, and can determine the calculation result as the second token value of the target node.

Specifically, let the first token seed be t1, the updated second token seed be t2 and the first token value of the target node in the blockchain system before update be t. If t1>t2, calculation can be performed on the basis of the updated second token seed t2, the first token seed t1 and the first token value t of the target node before update, such that the second token value k of the target node can be determined according to the calculation result. In one embodiment, the calculation result obtained on the basis of the second token seed t2, the first token seed t1 and the first token value t of the target node before update is: $t2*t/t1$, that is, when t1>t2, the second token value k obtained by updating the first token value of the target node is equal to $t2*t/t1$.

In one embodiment, if the first token seed is less than or equal to the second token seed, the target node can determine the value range of the second token value of the target node according to the first token seed, the second token seed and the first token value of the target node, such that the second token value can be determined from the value range.

Specifically, let the first token seed be t1, the updated second token seed be t2 and the first token value of the target node in the blockchain system before update be t. If t1, t2, the value range of the second token value k can be calculated on the basis of the updated second token seed t2, the first token seed t1 and the first token value t of the target node before update. In one embodiment, the value range of the second token value k calculated on the basis of the updated second token seed t2, the first token seed t1 and the first token value t of the target node before update can be: $t2*t/t1 \leq k < t2*(t+1)/t1$, that is, when $t1 \leq t2$, the value range of k is: $t2*t/t1 \leq k < t2*(t+1)/t1$.

S207: the target node determines a second serial number range where the first block is located on the basis of the second token seed and the serial number of the first block, and updates the blocks stored in the target node on the basis of the second serial number range and the second token value.

After the target node determines the second token seed, the second serial number range where the first block is located can be determined by combining with the serial number of the first block. When the second serial number range where the first block is located is determined, the nodes in the blockchain system can be redivided on the basis of the second token seed first, that is, the target seed can redivide the nodes in the blockchain system with the node number changed into a plurality of unit blocks, so that each unit block can be divided into a plurality of block serial number ranges on the basis of the second token seed, and the second serial number range where the first block is located can be determined by combining with the serial number of the first block. In one embodiment, after the target node determines the second serial number range where the first block is located, the blocks stored in the target node can be updated according to the second serial number range and the second token value.

Specifically, when updating the blocks stored in the target node on the basis of the second serial number range and the second token value, the target node can determine the block needing to be stored and the block needing to be deleted according to the second serial number range and the second token value, and can store the block needing to be stored and record the block needing to be deleted.

In one embodiment, when the target node stores the block needing to be stored, the target node can transmit a block acquisition request to the first node included in the blockchain system, wherein the block acquisition request comprises the serial number of the block that the target nodes needs to store but does not store, and the first node is a node different from the second token value of the target node. After the first node receives the block acquisition request transmitted by the target node, the block that the target node needs to store can be determined according to the serial number, included in the block acquisition request, of the block that the target node needs to store but does not store, so that the block that the target node needs to store but does not store is transmitted to the target node, and after the target node receives the block that needs to be stored but is not stored, the block that needs to be stored but is not stored is stored.

In the specific implementation, each node in the blockchain system will pre-establish communication connection and exchange the token value between the nodes which establish communication connection when the communication connection is established; therefore, when the target node needs to store the block that the target node needs to store but does not store, the block acquisition request can be transmitted to the first node different from the first token value of the target node, so that the block that needs to be stored but is not stored is acquired, or when the target node needs to traverse the data of the blockchain system, the whole blockchain data are traversed by inquiring the blocks stored in the node different from the token value.

In one embodiment, since the target node determines to store the first block or the block head of the first block on the basis of the first token value of the target node, the first block serial number and the first token seed, the blocks stored in any two nodes with the same token value in the blockchain system are the same. Therefore, when the target node determines the block that needs to be stored but is not stored, it is necessary to transmit the block acquisition request to the node different from the target node in token value to obtain the block that the target node needs to store but does not store.

In one embodiment, if it is detected that a node exits the blockchain system, after the node exits the blockchain system, the number of the nodes in the blockchain system can be updated, the first token value is updated on the basis of the number of the updated nodes in the blockchain system to obtain a second token value, and the first token value of the target node is updated on the basis of the second token value to obtain the second token value of the target node, such that the block that the target node needs to delete can be determined according to the second token value of the target node, and the block needing to be deleted is deleted from the target node. When the target node deletes the block needing to be deleted, the target node can only delete the block data of the block needing to be deleted, and the block head which stores the block needing to be deleted is still retained.

When the target node deletes the block needing to be deleted, a token cycle corresponding to the blockchain system is determined according to the first token seed and the second token seed, and the block needing to be deleted is deleted on the basis of the token cycle. Specifically, after the target node determines the block needing to be deleted, the block needing to be deleted can be recorded first, and when the next token cycle comes, the block data of the block needing to be deleted is deleted and the block head of the block needing to be deleted is retained.

In the embodiment of the present invention, the target node can acquire the serial number of a newly generated first block broadcasted in the blockchain system and acquire the first token seed so as to determine the first serial number range where the first block is located on the basis of the first token seed and the serial number of the first block. Further, the target node can determine to store the first block or store the block head of the first block on the basis of the first serial number range and the first token value of the target node. When the token seed update time is reached, the target node acquires the second token seed, updates the first token value of the target node on the basis of the second token seed to obtain a second token value, and determines the second serial number range where the first block is located on the basis of the second token seed and the serial number of the first block, such that the blocks stored in the target node can be updated on the basis of the second serial number range and the second token value, and the data stored by the nodes in the blockchain system are updated timely. For the nodes with large data amount, the network flow can be effectively reduced and the data storage pressure and data update pressure can be relieved.

The embodiment of the present invention further provides a data storage device. The data storage device comprises units for performing any one of the foregoing methods. Specifically, referring to FIG. 3 which is a schematic block diagram of a data storage device provided by an embodiment of the present invention, a data storage device of the embodiment comprises an acquisition unit 301 and a determination unit 302.

Figure 3:
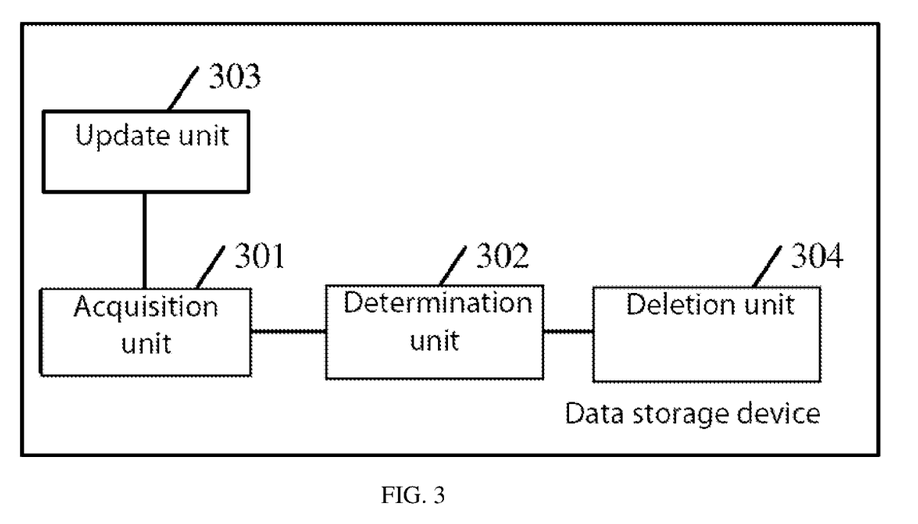
FIG. 3 is a schematic block diagram of a data storage device provided by the an embodiment of the present invention.

The acquisition unit 301 is used for acquiring the serial number of a newly generated first block broadcasted in the blockchain system, wherein the target node is any one of the plurality of nodes, the first block comprises block data and a block head, and the block head comprises the serial number of the first block;

the acquisition unit 301 is further used for acquiring a first token seed, wherein the first token seed is generated according to the number of nodes of the blockchain system;

the determination unit 302 is used for determining a first serial number range where the first block is located on the basis of the first token seed and the serial number of the first block;

the determination unit 302 is used for determining to store the first block or store the block head of the first block on the basis of the first serial number range and a first token value of the target node.

In one embodiment, the determination unit 302 is specifically used for:

determining a target block unit where the first block is located on the basis of the serial number of the first block, wherein each block unit includes the same number of blocks;

dividing the target block unit on the basis of the first token seed to obtain a plurality of serial number ranges, wherein different serial number ranges correspond to different token values; and determining the first serial number range where the first block is located from the plurality of serial number ranges on the basis of the serial number of the first block.

In one embodiment, the determination unit 302 is specifically used for:

determining a target serial number range corresponding to the first token value from the plurality of serial number ranges;

judging whether the first serial number range is consistent with the target serial number range;

if yes, storing the first block; and if no, storing the block head of the first block.

In one embodiment, the device further comprises an update unit 303.

The acquisition unit 301 is further used for acquiring a second token seed when the token seed update time is reached, wherein the second token seed is generated on the basis of the number of the current nodes of the blockchain system when the token seed update time is reached;

the update unit 303 is used for updating the first token value on the basis of the second token seed to obtain a second token value of the target node;

the update unit 303 is further used for determining a second serial number range where the first block is located on the basis of the second token seed and the serial number of the first block, and updating the blocks stored in the target node on the basis of the second serial number range and the second token value.

In one embodiment, the determination unit 302 is specifically used for:

determining a block needing to be stored and a block needing to be deleted according to the second serial number range and the second token value; and storing the block needing to be stored and recording the block needing to be deleted.

In one embodiment, the determination unit 302 is specifically used for:

transmitting a block acquisition request to a first node, wherein the block acquisition request comprises the serial number of the block that the target node needs to store but does not store, and the first node is any one of a node set with token values different from the second token value in the blockchain system;

receiving the block that the target node needs to store but does not store, which is transmitted by the first node on the basis of the block acquisition request; and storing the block that needs to be stored but is not stored.

In one embodiment, the device further comprises a deletion unit 304.

The deletion unit 304 is used for deleting block data of the block needing to be deleted recorded in the last token cycle, wherein the token cycle is a time period when two adjacent token seeds are generated.

In one embodiment, the update unit 303 is specifically used for:

performing calculation according to the first token seed, the second token seed and the first token value of the target node when the first token seed is greater than the second token seed and determining the calculation result as the second token value of the target node; and determining the value range of the second token value of the target node according to the first token seed, the second token seed and the first token value of the target node when the first token seed is less than the second token seed, and determining the second token value from the value range.

In the embodiment of the present invention, the acquisition unit 301 first acquires the serial number of the newly generated first block broadcasted in the blockchain system and acquires the first token seed generated on the basis of the number of the nodes of the blockchain system, so that the determination unit 302 can determine the first serial number range where the first block is located on the basis of the first token seed and the serial number of the first block to further determine to store the first block or store the block head of the first block on the basis of the first serial number range and the first token value of the target node, thereby effectively relieving the data storage pressure of the target node, improving the problem of too large network flow in the blockchain system and preventing the data in the blockchain system from being tampered maliciously.

Figure 4:
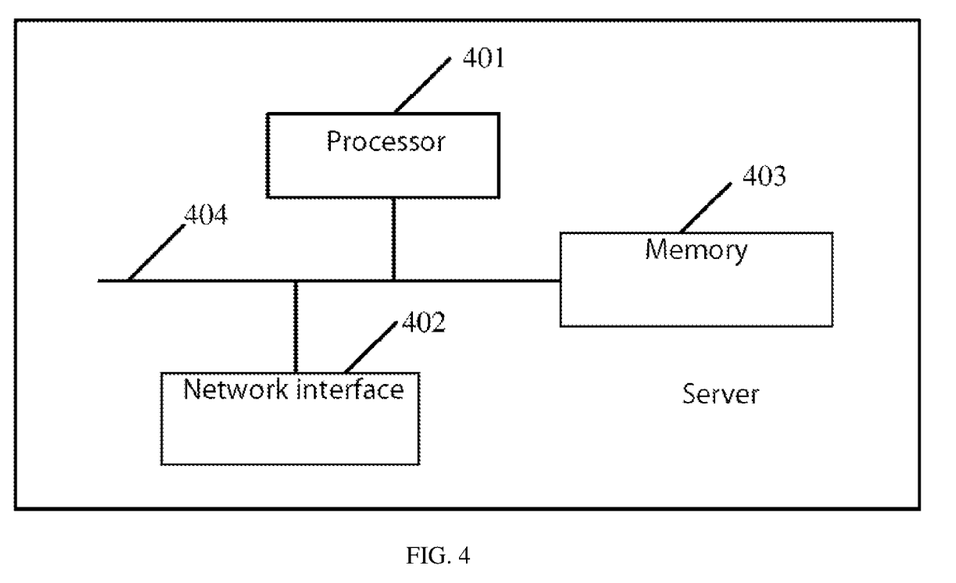
FIG. 4 is a schematic block diagram of a server provided by an embodiment of the present invention.

Referring to FIG. 4 which is a schematic block diagram of a server provided by an embodiment of the present invention, the server is used for realizing a data storage device mentioned in the above method embodiment. The server in the embodiment as shown in the figure can comprise: one or more processors 401, one or more network interfaces 402 and a memory 403. The processor 401, the network interface 402 and the memory 403 are connected through a bus 404. The memory 403 is used for storing a computer program. The computer program comprises a program instruction. The processor 401 is used for executing the program instruction stored in the memory 403. The processor 401 is configured to call the program instruction to:

acquire, by a target node, the serial number of a newly generated first block broadcasted in the blockchain system, wherein the target node is any one of the plurality of nodes, the first block comprises block data and a block head, and the block head comprises the serial number of the first block;

acquire, by the target node, a first token seed, wherein the first token seed is generated according to the number of nodes of the blockchain system;

determine, by the target node, a first serial number range where the first block is located on the basis of the first token seed and the serial number of the first block; and determine, by the target node, to store the first block or store the block head of the first block on the basis of the first serial number range and a first token value of the target node.

In one embodiment, the processor 401 is further configured to call the program instruction to:

determine, by the target node, a target block unit where the first block is located on the basis of the serial number of the first block, wherein each block unit includes the same number of blocks;

divide, by the target node, the target block unit on the basis of the first token seed to obtain a plurality of serial number ranges, wherein different serial number ranges correspond to different token values; and determine, by the target node, the first serial number range where the first block is located from the plurality of serial number ranges on the basis of the serial number of the first block.

In one embodiment, the processor 401 is further configured to call the program instruction to:

determine, by the target node, a target serial number range corresponding to the first token value from the plurality of serial number ranges;

judge, by the target node, whether the first serial number range is consistent with the target serial number range;

if yes, store, by the target node, the first block; and if no, store, by the target node, the block head of the first block.

In one embodiment, the processor 401 is further configured to call the program instruction to:

acquire, by the target node, a second token seed when the token seed update time is reached, wherein the second token seed is generated on the basis of the number of the current nodes of the blockchain system when the token seed update time is reached;

update, by the target node, the first token value on the basis of the second token seed to obtain a second token value of the target node; and determine, by the target node, a second serial number range where the first block is located on the basis of the second token seed and the serial number of the first block, and update the blocks stored in the target node on the basis of the second serial number range and the second token value.

In one embodiment, the processor 401 is further configured to call the program instruction to:

determine, by the target node, a block needing to be stored and a block needing to be deleted according to the second serial number range and the second token value; and store, by the target node, the block needing to be stored and record the block needing to be deleted.

In one embodiment, the processor 401 is further configured to call the program instruction to:

transmit, by the target node, a block acquisition request to a first node, wherein the block acquisition request comprises the serial number of the block that the target node needs to store but does not store, and the first node is any one of a node set with token values different from the second token value in the blockchain system;

receive, by the target node, the block that the target node needs to store but does not store, which is transmitted by the first node on the basis of the block acquisition request; and store, by the target node, the block that the target node needs to store but does not store.

In one embodiment, the processor 401 is further configured to call the program instruction to:

delete, by the target node, block data of the block needing to be deleted recorded in the last token cycle, wherein the token cycle is a time period when two adjacent token seeds are generated.

In one embodiment, the processor 401 is further configured to call the program instruction to:

perform, by the target node, calculation according to the first token seed, the second token seed and the first token value of the target node when the first token seed is greater than the second token seed, and determine the calculation result as a second token value of the target node; and determine, by the target node, the value range of the second token value of the target node according to the first token seed, the second token seed and the first token value of the target node when the first token seed is less than the second token seed, and determine the second token value from the value range.

Another embodiment of the present invention provides a computer-readable storage medium. The computer-readable storage medium stores a computer program. The computer program comprises a program instruction. The program instruction, when being executed by the processor, implements the methods described in FIG. 1 and FIG. 2.

The above merely describes specific embodiments of the disclosure, but the protection scope of the disclosure is not limited thereto. Any person skilled in the art can easily conceive equivalent modifications or substitutions within the technical scope of the disclosure, and these modifications or substitutions shall fall within the protection scope of the disclosure. Therefore, the protection scope of the disclosure should be subject to the protection scope of the claims.

The invention claimed is:

1. A data storage method, applied to a blockchain system, the blockchain system comprising a plurality of nodes, the method comprising:

acquiring, by a target node, a serial number of a newly generated first block broadcasted in the blockchain system, wherein the target node is any one of the plurality of nodes, the first block comprises block data and a block head, and the block head comprises the serial number of the first block and summary data of the first block, and the first block is a newly generated block in any node in the blockchain system;

acquiring, by the target node, a first token seed, wherein the first token seed is generated according to a number of nodes of the blockchain system;

determining, by the target node, a first serial number range where the first block is located on a basis of the first token seed and the serial number of the first block; and determining, by the target node, to store the first block or store the block head of the first block on a basis of the first serial number range and a first token value of the target node, wherein the first token value of the target node is generated based on the first token seed.

2. The method according to claim 1, characterized in that the step of determining, by the target node, a first serial number range where the first block is located on the basis of the first token seed and the serial number of the first block comprises:

determining, by the target node, a target block unit where the first block is located on a basis of the serial number of the first block, wherein each block unit includes a same number of blocks;

dividing, by the target node, the target block unit on a basis of the first token seed to obtain a plurality of serial number ranges, wherein different serial number ranges correspond to different token values; and determining, by the target node, a first serial number range where the first block is located from the plurality of serial number ranges on a basis of the serial number of the first block.

3. The method according to claim 2, characterized in that the step of determining, by the target node, to store the first block or store the block head of the first block on the basis of the first serial number range and a first token value of the target node comprises:

determining, by the target node, a target serial number range corresponding to the first token value from the plurality of serial number ranges;

judging, by the target node, whether the first serial number range is consistent with the target serial number range;

if yes, storing, by the target node, the first block; and if no, storing, by the target node, the block head of the first block.

4. The method according to claim 1, characterized by further comprising:

acquiring, by the target node, a second token seed when a token seed update time is reached, wherein the second token seed is generated on a basis of a number of the current nodes of the blockchain system when the token seed update time is reached;

updating, by the target node, the first token value on a basis of the second token seed to obtain a second token value of the target node; and determining, by the target node, a second serial number range where the first block is located on a basis of the second token seed and the serial number of the first block, and updating a block stored in the target node on a basis of the second serial number range and the second token value.

5. The method according to claim 4, characterized in that the step of updating a block stored in the target node on the basis of the second serial number range and the second token value comprises:

determining, by the target node, a block needing to be stored and a block needing to be deleted according to the second serial number range and the second token value; and storing, by the target node, the block needing to be stored and recording the block needing to be deleted.

6. The method according to claim 5, characterized in that the step of storing, by the target node, the block needing to be stored comprises:

transmitting, by the target node, a block acquisition request to a first node, wherein the block acquisition request comprises a serial number of a block that the target node needs to store but does not store, and the first node is any one of a node set with token values different from the second token value in the blockchain system;

receiving, by the target node, the block that the target node needs to store but does not store, which is transmitted by the first node on a basis of the block acquisition request; and storing, by the target node, the block that the target node needs to store but does not store.

7. The method according to claim 5, characterized by further comprising:

deleting, by the target node, block data of the block needing to be deleted recorded in a last token cycle, wherein the token cycle is a time period when two adjacent token seeds are generated.

8. The method according to claim 4, characterized in that the step of updating, by the target node, the first token value on the basis of the second token seed to obtain a second token value of the target node comprises:

performing, by the target node, calculation according to the first token seed, the second token seed and the first token value of the target node when the first token seed is greater than the second token seed, and determining a calculation result as the second token value of the target node; and determining, by the target node, a value range of the second token value of the target node according to the first token seed, the second token seed and the first token value of the target node when the first token seed is less than the second token seed, and determining the second token value from the value range.

9. A node server, characterized by comprising a memory, a network interface and a processor, wherein the memory stores a computer program, the network interface is used for receiving and transmitting a message under the control of the processor, and the processor implements operations as follows when executing the computer program:

acquiring a newly generated first block broadcasted in a blockchain system, wherein the first block comprises block data and a block head, and the block head comprises a serial number of the first block and summary data of the first block, and the first block is a newly generated block in any node in the blockchain system;

acquiring a first token seed, wherein the first token seed is generated according to a number of nodes of the blockchain system;

determining a first serial number range where the first block is located on a basis of the first token seed and the serial number of the first block; and determining to store the first block or store the block head of the first block on a basis of the first serial number range and a first token value of a target node, wherein the first token value of the target node is generated based on the first token seed.

10. The node server according to claim 9, characterized in that the operation of determining, by the processor, a first serial number range where the first block is located on the basis of the first token seed and the serial number of the first block is as follows:

determining a target block unit where the first block is located on a basis of the serial number of the first block, wherein each block unit includes a same number of blocks;

dividing the target block unit on a basis of the first token seed to obtain a plurality of serial number ranges, wherein different serial number ranges correspond to different token values; and determining a first serial number range where the first block is located from the plurality of serial number ranges on a basis of the serial number of the first block.

11. The node server according to claim 10, characterized in that the operation of determining, by the processor, to store the first block or store the block head of the first block on the basis of the first serial number range and a first token value of the target node is as follows:

determining a target serial number range corresponding to the first token value from the plurality of serial number ranges;

judging whether the first serial number range is consistent with the target serial number range;

if yes, storing, by the target node, the first block; and if no, storing, by the target node, the block head of the first block.

12. The node server according to claim 9, and the processor, when executing the computer program, further implements operations as follows:

acquiring a second token seed when a token seed update time is reached, wherein the second token seed is generated on a basis of a number of the current nodes of the blockchain system when the token seed update time is reached;

updating the first token value on a basis of the second token seed to obtain a second token value of the target node; and determining a second serial number range where the first block is located on a basis of the second token seed and the serial number of the first block, and updating a block stored in the target node on a basis of the second serial number range and the second token value.

13. The node server according to claim 12, characterized in that the operation of updating, by the processor, a block stored in the target node on the basis of the second serial number range and the second token value is as follows:

determining a block needing to be stored and a block needing to be deleted according to the second serial number range and the second token value; and storing the block needing to be stored and recording the block needing to be deleted.

14. The node server according to claim 13, characterized in that the operation of storing, by the processor, the block needing to be stored is as follows:

transmitting a block acquisition request to a first node, wherein the block acquisition request comprises a serial number of a block that the target node needs to store but does not store, and the first node is any one of a node set with token values different from the second token value in the blockchain system;

receiving the block that the target node needs to store but does not store, which is transmitted by the first node on a basis of the block acquisition request; and storing, the block that the target node needs to store but does not store.

15. The node server according to claim 13, and the processor, when executing the computer program, further implements operations as follows:

deleting block data of the block needing to be deleted recorded in a last token cycle, wherein the token cycle is a time period when two adjacent token seeds are generated.

16. The node server according to claim 12, characterized in that the operation of updating, by the processor, the first token value on the basis of the second token seed to obtain a second token value of the target node is as follows:

performing calculation according to the first token seed, the second token seed and the first token value of the target node when the first token seed is greater than the second token seed, and determining a calculation result as the second token value of the target node; and determining a value range of the second token value of the target node according to the first token seed, the second token seed and the first token value of the target node when the first token seed is less than the second token seed, and determining the second token value from the value range.

17. A non-transitory computer-readable storage medium, storing a computer program, characterized in that the computer program, when being executed by a processor, implements operations as follows:

acquiring a newly generated first block broadcasted in a blockchain system, wherein the first block comprises block data and a block head, and the block head comprises a serial number of the first block and summary data of the first block, and the first block is a newly generated block in any node in the blockchain system;

acquiring a first token seed, wherein the first token seed is generated according to a number of nodes of the blockchain system;

determining a first serial number range where the first block is located on a basis of the first token seed and the serial number of the first block; and determining to store the first block or store the block head of the first block on a basis of the first serial number range and a first token value of a target node, wherein the first token value of the target node is generated based on the first token seed.

18. The non-transitory computer-readable storage medium according to claim 17, characterized in that the operation of determining, by the processor, a first serial number range where the first block is located on the basis of the first token seed and the serial number of the first block is as follows:

determining a target block unit where the first block is located on a basis of the serial number of the first block, wherein each block unit includes a same number of blocks;

dividing the target block unit on a basis of the first token seed to obtain a plurality of serial number ranges, wherein different serial number ranges correspond to different token values; and determining a first serial number range where the first block is located from the plurality of serial number ranges on a basis of the serial number of the first block.

19. The non-transitory computer-readable storage medium according to claim 18, characterized in that the operation of determining, by the processor, to store the first block or store the block head of the first block on the basis of the first serial number range and a first token value of the target node is as follows:

determining a target serial number range corresponding to the first token value from the plurality of serial number ranges;

judging whether the first serial number range is consistent with the target serial number range;

if yes, storing, by the target node, the first block; and if no, storing, by the target node, the block head of the first block.

20. The non-transitory computer-readable storage medium according to claim 17, and the processor, when executing the computer program, further implements operations as follows:

acquiring a second token seed when a token seed update time is reached, wherein the second token seed is generated on a basis of a number of the current nodes of the blockchain system when the token seed update time is reached;

updating the first token value on a basis of the second token seed to obtain a second token value of the target node; and determining a second serial number range where the first block is located on a basis of the second token seed and the serial number of the first block, and updating a block stored in the target node on a basis of the second serial number range and the second token value.

21. The non-transitory computer-readable storage medium according to claim 20, characterized in that the operation of updating, by the processor, a block stored in the target node on the basis of the second serial number range and the second token value is as follows:

determining a block needing to be stored and a block needing to be deleted according to the second serial number range and the second token value; and storing the block needing to be stored and recording the block needing to be deleted.

22. The non-transitory computer-readable storage medium according to claim 21, characterized in that the operation of storing, by the processor, the block needing to be stored is as follows:

transmitting a block acquisition request to a first node, wherein the block acquisition request comprises a serial number of a block that the target node needs to store but does not store, and the first node is any one of a node set with token values different from the second token value in the blockchain system;

receiving the block that the target node needs to store but does not store, which is transmitted by the first node on a basis of the block acquisition request; and storing, the block that the target node needs to store but does not store.

23. The non-transitory computer-readable storage medium according to claim 21, and the processor, when executing the computer program, further implements operations as follows:

deleting block data of the block needing to be deleted recorded in a last token cycle, wherein the token cycle is a time period when two adjacent token seeds are generated.

24. The non-transitory computer-readable storage medium according to claim 20, characterized in that the operation of updating, by the processor, the first token value on the basis of the second token seed to obtain a second token value of the target node is as follows:

performing calculation according to the first token seed, the second token seed and the first token value of the target node when the first token seed is greater than the second token seed, and determining a calculation result as the second token value of the target node; and determining a value range of the second token value of the target node according to the first token seed, the second token seed and the first token value of the target node when the first token seed is less than the second token seed, and determining the second token value from the value range.

\* \* \* \* \*